May 6, 1969 J. A. MAASS 3,443,036

HALL EFFECT MAGNETIC TAPE SCANNING DEVICE

Filed April 6, 1965 Sheet 1 of 2

INVENTOR,
JOACHIM A. MAASS.

BY Harry M. Saragovitz
Edward J. Kelly, Herbert Berl
Julian C. Keppler
ATTORNEYS INVENTOR,
JOACHIM A. MAASS.
BY Harry M. Saragovitz
Edward J. Kelly, Herbert Berl
Julian C. Keppler
ATTORNEYS

United States Patent Office 3,443,036
Patented May 6, 1969

3,443,036

HALL EFFECT MAGNETIC TAPE SCANNING DEVICE

Joachim A. Maass, Belmar, N.J., assignor to the United States of America as represented by the Secretary of the Army Filed Apr. 6, 1965, Ser. No. 446,132
Int. Cl. G11b *5/38*
U.S. Cl. 179—100.2 3 Claims

ABSTRACT OF THE DISCLOSURE

This invention relates to Hall effect devices and particularly to an elongated, multiple-unit, Hall effect device positioned along one edge of a flat substrate, that can be combined with other, similar units in a stack with their one edges in a common plane to sample the magnetic data on a corresponding surface.

The invention described herein may be manufactured and used by or for the Government for governmental purposes without the payment of any royalty thereon.

*Prior art*

In the prior art, Hall effect devices are well known and are used in many ways to detect or utilize the presence of a magnetic field. Hall effect pickup heads have been used for the detection of signals on a magnetic tape, but only single units have been used, or would be practical, because of their bulk and complexity.

Scanning devices are also well known but almost all of these employ mechanical scanning techniques that have the inescapable limitations and disadvantages of mechanical motion and they usually require motion of both the head and the tape to scan a complete frame as in a television picture.

There is a device for electronic scanning of magnetic tapes that employs an electron-beam deflection system, and while it can scan a stationary tape, it can only scan a single line at a time. Furthermore, it is mechanically bulky, it is not capable of being miniaturized or ruggedized, and it has a comparatively high power requirement in addition to the necessary readout circuitry.

It is therefore an object of this invention to provide an improved, solid-state, magnetic-tape scanner.

It is a further object of this invention to provide an improved, solid-state, magnetic tape scanner that can read out data without relative motion of the scanner with respect to the tape.

It is a further object of this invention to provide an improved, solid-state, multielement, Hall effect, videotape scanner that can read out successive rows of magnetic data bits without relative motion between the device and the tape.

These and other objects are accomplished by printing, depositing, or otherwise applying a continuous strip of Hall effect element or plate along one edge of a very thin film or substrate, and, similarly, applying a series of pairs of electrical contacts and conductors along said strip. Each pair of said contacts provides contact with the opposite edges of a portion of said strip, and each contact has a conductor to connect it to additional circuitry to form multiple, Hall effect elements or plates. A current is passed through the multiple Hall effect elements in series along the edge of the substrate and the Hall effect voltages are detected across the pairs of opposing contacts.

The multiple, Hall effect elements or plates are applied to the substrate, along with the contacts, conductors, and any other desired circuitry to provide a layer or chip that may be of any desired length. The layer may include as many active elements as are possible within the existing technological limitations.

Additional layers or chips of similar construction can be put together to provide a stack or block, with the Hall effect plates forming a matrix that permits the scanning of a whole area of tape electronically for any single placement of the matrix.

This invention will be better understood and other objects of this invention will become apparent from the following specification and drawings, in which.

Figure 1:
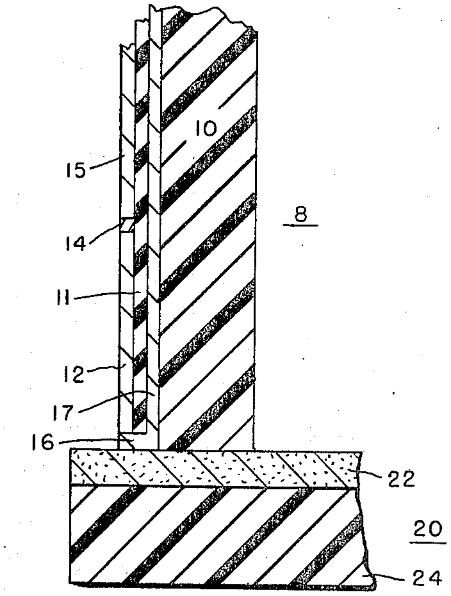
FIG. 1 shows a cross-section through a single one of the layers or chips.

Referring now more particularly to FIG. 1, a cross-section through one of the elements or plates of one of the multiple-element layers or chips 8 is shown with its film or substrate 10, which, indirectly, supports a strip of Hall effect material 12 which is to form the multiple, Hall effect elements or plates. The layers or chips 8 are to be used in conjunction with a magnetic tape 20 having an oxide coating 22 over a plastic base 24.

A pair of contacts 14 and 16 make electrical contact with the opposing edges of the portion of the strip 12 that forms this particular element, and the conductors 15 and 17 connect these contacts to suitable circuitry which is not shown here.

The conductor 15, which connects the upper contact 14 to the suitable circuitry, can simply extend upward, in the same plane as that of the Hall effect strip.

However, since the conductor 17 must connect the lower contact 16 to the suitable circuitry above the Hall effect sample, this conductor must be separated, or electrically insulated, from the Hall effect element 12 as well as from the other conductor 15. This separation is provided here by first applying the conductor 17, and all of the corresponding conductors for the other Hall effect elements, directly to the substrate 10, and then applying a layer of insulation 11 on top of the conductors 17 before applying the continuous Hall effect strip 12 and the contact 14 and conductor 15 along with all of the corresponding contacts and conductors for the other Hall effect elements.

The contact 16, along with all of the corresponding contacts for the other Hall effect elements, may be applied at the time its conductor 17 is applied, or when the opposing contact 14 is applied.

Figure 2:
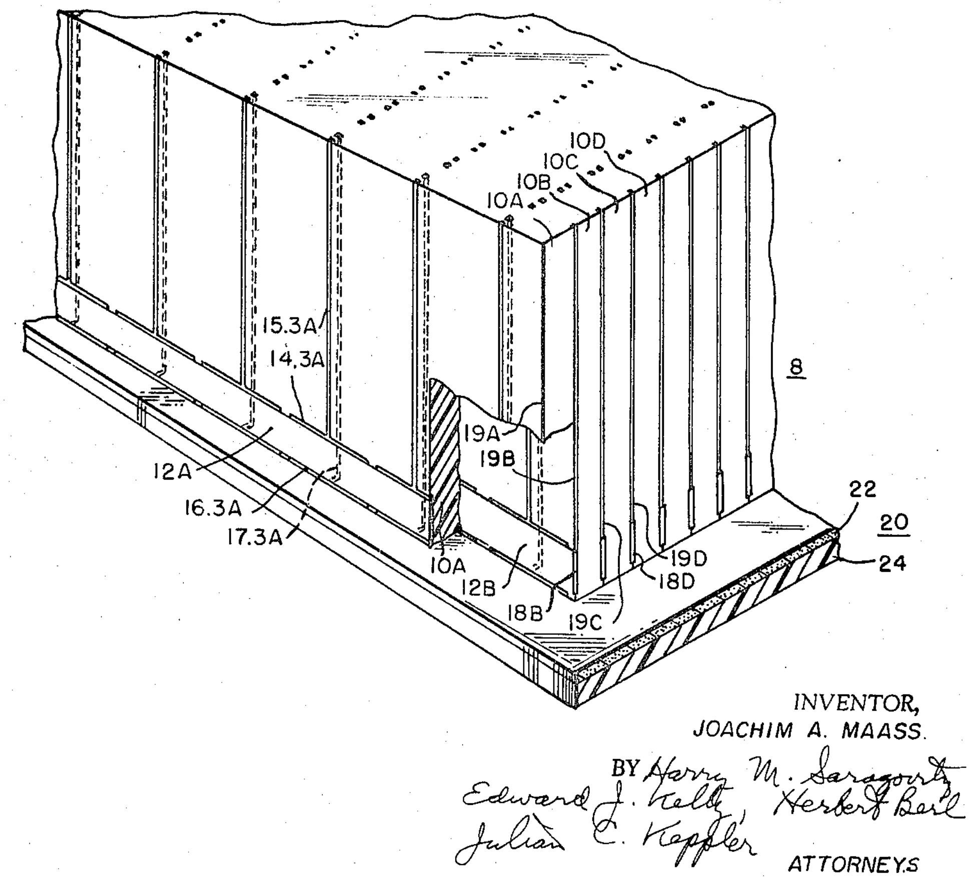
FIG. 2 shows a plurality of such layers or chips in a stack or block, positioned in contact with a magnetic tape.

The orientation of typical contacts and conductors and the relationship between the Hall effect elements is more clearly seen in FIG. 2 which shows an isometric view of a stack or block of layers or chips, such as the layer shown in FIG. 1. The first layer 10A is cut away to show the similarity of each successive layer.

The individual layers are similarly numbered but are separately identified by successive letters; the individual elements, and their associated contacts and conductors, are similarly numbered, but are separately identified by successive decimal numbers.

It can be seen here that while each of the pairs of contacts, such as 14.3A and 16.3A oppose each other to define a unit that functions as a single Hall effect element, all of these elements are in series, and the actual Hall effect plate may be part of one continuous strip 12A. The current that is necessary for the Hall effect in each individual element will run through all the elements in series.

The magnetic tape 20 is again clearly seen, with its plastic base 24 and its oxide coating 22 which is in contact with all of the elements in the matrix.

The principle of the Hall effect is well known and the manner of connection of Hall effect elements to the necessary sources of current and to detectors is also well known. In this case however, a single source of current will supply all of the elements in series to energize a very great number of sampling elements with a minimum of wiring. These strips 12 of series-connected elements have contacts such as 18B or 18D, with corresponding conductors 19B and 19D, at each end. These may be connected to any suitable source of current in any well known manner.

Figure 3:
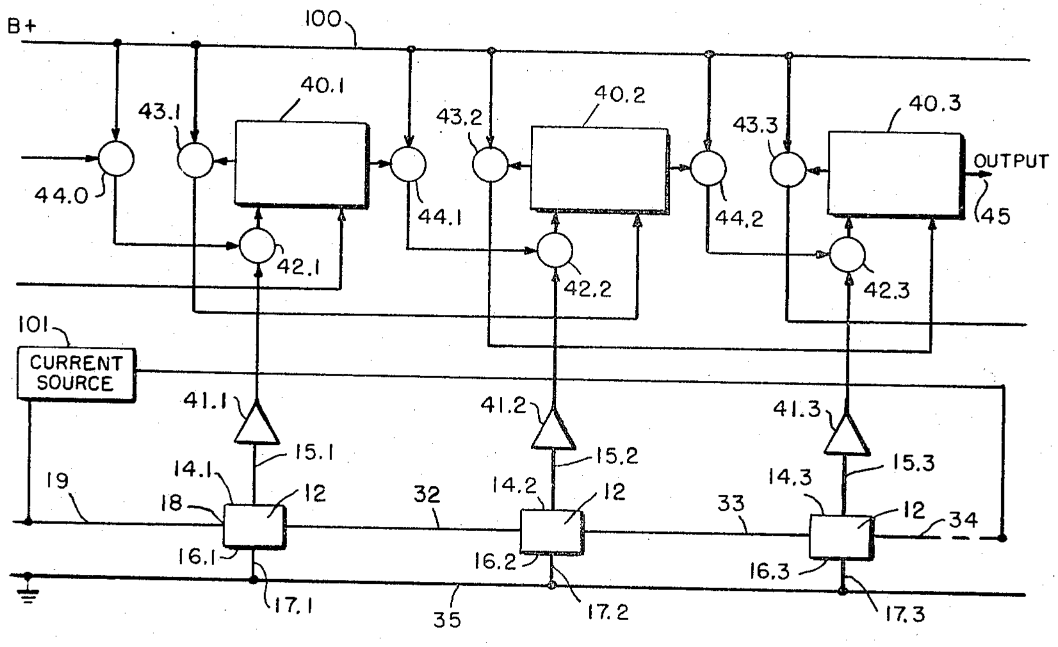
FIG. 3 is a block diagram showing the connection of the elements into a typical, shift-register, readout circuit.

FIG. 3 shows the block diagram of a typical circuit for connecting, through the conductors 15 and 17, the opposing contacts of each of the multiple Hall effect elements to detect and utilize the available signals.

This circuit will be recognized as one of the well known types of shift registers in which a plurality of individual bits of data are received and stored in separate, bistable units that can be read out as a train of successive bits of data from one end of the shift register. A typical shift register that can be adapted to this circuit is seen in FIG. 7–0.12 of the Military Handbook 215, entitled "Selected Semiconductor Circuits" published in June 1960, formerly (Navships 93484).

In FIG. 3, the elements 12 are the individual elements of the multiplate, Hall effect strip 12 with the portion between each of the pairs of contacts 14.1–16.1; 14.2–16.2; and so forth separated for clarity of block diagramming. These portions correspond to the portions of the Hall effect strip 12 of FIG. 2, with correspondingly numbered contacts. The connections 32 and 33 indicate the series electrical connection of these elements.

The contacts 14 connect through the conductors 15 to amplifiers 41.1, 42.2, and 41.3. The amplifiers 41 connect to "OR" gates 42.1, 42.2, and 42.3 which connect to the bistable or "flip-flop" circuits 40.1, 40.2, and 40.3.

The "flip-flop" circuits 40 are also connected through "AND" gates 43, as well as the "AND" gates 44 to the source of voltage 100, which also supplies the read-out signals.

In operation, the "flip-flop" circuits 40 may be considered to be in a "zero," starting position. The application of a current—or pulse—from the source 101 through the Hall effect strip 12 (lines 19, 32, 33, 34) induces a Hall effect voltage across the contacts 14–16 of any of the elements that is under the influence of a magnetic field. The voltage is amplified by the corresponding one of the amplifiers 41, to pass through the corresponding one of the "OR" gates 42, to the associated one of the "flip-flop" circuits 40. If the voltage is greater than a prescribed voltage, it will switch the "flip-flop" circuit from its "zero" position to a "one" position that will be held until the "flip-flop" circuit is restored to its "zero" position by another impulse or a read-out sequence of the shift register as a whole.

The readout of the shift register is accomplished in a well known manner by applying a repetitive series of pulses to the line 100. Each pulse "shifts" the condition on each of the circuits 40 to the adjacent circuit and shifts the last circuit condition to the output line 45. The series of pulses provides a sequence of bits of output data that can be utilized in a well known manner.

Only three units of the shift register are shown for simplicity. It is considered obvious that additional units may be added, either before 40.1 or after 40.3. In either case, as many units may be added as may be necessary to provide for the separate Hall effect elements in each of the layers, or in the whole stack of layers.

If no unit is provided before 40.1, there will be no signal from 44.0 to be passed on and the connection from 44.0 to the diode "OR" gate 42.1 can be omitted.

While the FIGS. 1 and 2 and description of this preferred embodiment of the invention show the current flowing through the series combination of Hall plates as one continuous unit, these Hall plates could be separate units with current contacts on either side. These current contacts could then be connected together as suggested in FIG. 3 or each contact could have a separate conductor extending up along the substrate in the same manner as the other conductors for remote series connection or any desired interconnection at any desired point.

The current conductors 19A, 19B, 19C, etc., seen in FIG. 2, and the corresponding current conductors, not visible, at the other ends of the strips can be connected in parallel to a common source of current. Otherwise, the alternate pairs of conductors at either end of the strips can be connected together in series to put all of the Hall effect strips 12 in a single, series circuit.

The substrate illustrated in FIGS. 2 and 3 of the drawings is typical of the state of the art and comprises a thin film of ceramic or other suitable material, the various conductors, contacts, and Hall plates, as well as the insulating layers, are deposited on the substrate material or on each other where necessary. It is obvious that these elements and the substrate can be reduced in size and thickness by advanced, microminiaturization techniques that will advance with the state of the art.

It is anticipated that the substrate may eventually be several orders of magnitude less than that of the tape itself, since the tape must have sufficient strength to be handled by the available tape transport mechanisms whereas the successive layers of a stack mutually support each other. Ultimately, each successive substrate may be deposited on the preceding layer or chip to form the most compact, multilayer structure.

In any case it will be apparent that the various contacts, the conductors, and the Hall plate or plates can be applied to a substrate of any known kind by any of available means—such as printing, plating, etching or depositing—that are currently available.

The various circuitry for detecting and utilizing the signals from the individual Hall samples will be in accordance with known circuitry for sampling a long series of elements. Such circuitry is found in computers and related fields, and any of these circuits will be applicable as long as it can be physically and electrically combined with the conductors in the block.

The obvious way to couple suitable circuitry to such a small unit would be to extend the substrate to a size sufficient to accommodate additional circuitry such as that of FIG. 3, applied by techniques similar to those used to apply the existing contacts and conductors. In this way, only power, keying and readout circuit connections would be needed outside of the composite block.

While the foregoing device is particularly intended for the scanning of prerecorded signals, it is obvious that a device, complementary to this, would be necessary for the recording of suitable signals. The obvious form of such a recorder would have the identical matrix configuration, and could be constructed in the same manner as the foregoing scanning device. The actual recording could be bypassing currents through suitable elements equivalent to the contacts 16. It is even possible that the foregoing scanning device could be modified for this purpose.

While a specified set of conditions has been described to illustrate this device, it is obvious that variations in the current supply and in other parameters of the circuit will increase the flexibility and the utility of the foregoing device.

What is claimed is:

1. A solid-state stationary magnetic-tape, scanning device having a plurality of layers stacked together, each of said layers comprising a substrate;

a strip of Hall effect material deposited along one edge of said substrate;

a current source connected in series with said strip;

a plurality of pairs of contacts positioned along said strip on opposite sides of said strip;

a plurality of voltage sensitive means;

a plurality of pairs of conductors, each pair connecting one of said pairs of contacts to one of said voltage sensitive means to be actuated by the Hall effect voltage generated in response to a signal on said magnetic tape;

and shift register means connected to all of said voltage sensitive means for reading the outputs of said voltage sensitive means in rapid sequence.

2. In a device as in claim 1;

said strips of Hall effect material in all of said layers being connected in series across said current source.

3. In a device as in claim 1;

said strips of Hall effect material in all of said layers being connected in parallel across said source of current.

References Cited

UNITED STATES PATENTS

| | | | |
|---|---|---|---|
| 3,041,416 | 6/1962 | Kuhrt | 179—100.2 |
| 3,114,009 | 12/1963 | Camras | 179—100.2 |
| 3,121,874 | 2/1964 | Fisher | 346—74 |
| 3,233,228 | 2/1966 | Kaspar | 340—174 |

BERNARD KONICK, *Primary Examiner.*

J. R. GOUDEAU, *Assistant Examiner.*

U.S. Cl. X.R.

340—174